(12) United States Patent
Wu et al.

(10) Patent No.: US 12,487,949 B2
(45) Date of Patent: Dec. 2, 2025

(54) DYNAMICALLY ADJUSTING DATA READ SIZE

(71) Applicant: Micron Technology, Inc., Boise, ID (US)

(72) Inventors: Wenjun Wu, Shanghai (CN); Feng Xu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/630,609

(22) Filed: Apr. 9, 2024

(65) Prior Publication Data
US 2024/0345755 A1    Oct. 17, 2024

Related U.S. Application Data

(60) Provisional application No. 63/459,526, filed on Apr. 14, 2023.

(51) Int. Cl.
*G06F 13/16* (2006.01)

(52) U.S. Cl.
CPC .............................. *G06F 13/1689* (2013.01)

(58) Field of Classification Search
CPC .... G06F 3/0611; G06F 3/0638; G06F 3/0688; G06F 3/0656; G06F 13/1689
See application file for complete search history.

(56) References Cited

U.S. PATENT DOCUMENTS 9,906,468 B2 * 2/2018 Kessler ................... H04L 47/52
2022/0113895 A1 * 4/2022 Jang ....................... G06F 3/0655

* cited by examiner

*Primary Examiner* — Chie Yew
(74) *Attorney, Agent, or Firm* — Holland & Hart LLP

(57) ABSTRACT

Methods, systems, and devices for dynamically adjusting data read size are described. A memory system controller may be configured to dynamically adjust a size of data transmitted to a host system based on determining a quantity of data requested by the host system. The memory system controller may support receiving a read command of a first data size, incrementing a counter by the first data size, requesting the data from a memory device according to a second data size, and transmitting the data from the memory device according to a third data size based on the counter. The memory system controller may determine the counter does not satisfy a threshold and configure the third data size as a relatively small quantity of data. However, the memory system controller may determine the counter satisfies the threshold and configure the third data size as a relatively large quantity of data.

19 Claims, 7 Drawing Sheets

DYNAMICALLY ADJUSTING DATA READ SIZE

CROSS REFERENCE

The present application for patent claims the benefit of U.S. Provisional Patent Application No. 63/459,526 by WU et al., entitled "DYNAMICALLY ADJUSTING DATA READ SIZE," filed Apr. 14, 2023, assigned to the assignee hereof, and expressly incorporated by reference in its entirety herein.

TECHNICAL FIELD

The following relates to one or more systems for memory, including dynamically adjusting data read size.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
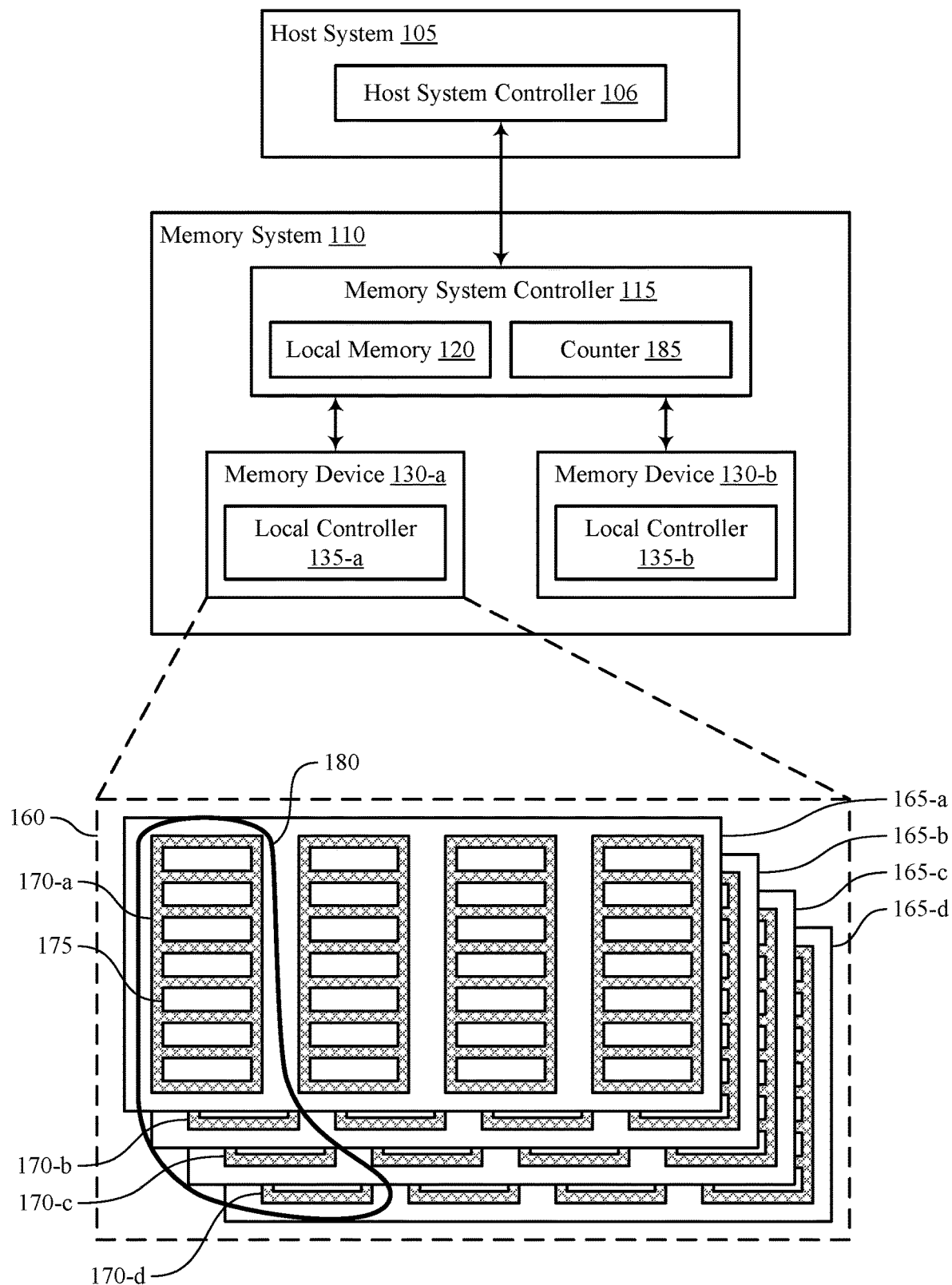
FIG. 1 illustrates an example of a system that supports dynamically adjusting data read size in accordance with examples as disclosed herein.

A system may include a host system configured to communicate with a memory system that includes a memory system controller managing one or more memory devices (e.g., as in a managed NAND (MNAND) system). For example, the memory system controller may be configured to perform access operations on the one or more memory devices in accordance with commands received from the host system. In some such examples, the memory system controller may manage translations between logical block addresses (e.g., a logical address space) used for transfer of data with the host system and physical block addresses (e.g., a physical address space) of the one or more memory devices. In some cases, the memory system controller may be configured to perform a single-device read operation in response to a read command from the host system, which may include reading data from each page of a memory block of a memory device before reading data from each page of another memory block of another memory device. In some such cases, performing the single-device read operation may include transmitting the data from a memory device to the memory system controller (e.g., where the memory system controller may store the data in a buffer) over a first channel (e.g., an open NAND flash interface (ONFI) channel) associated with the memory device and transmitting the data from the memory system controller to the host system over a second channel (e.g., universal flash storage (UFS) interface), which may support a relatively higher data transfer speed than the first channel. Because the memory system controller receives the data over the first channel before transmitting the data over the second channel, the relatively higher data transfer speed of the second channel may create wait durations in which the second channel may be capable of transmitting additional data before the additional data is received at the memory system controller. Therefore, transferring relatively larger quantities of data may cause relatively longer transfer latency over the first channel which may cause relatively greater overall latency for the system (e.g., due to the downstream impact of increasing the wait durations).

In accordance with examples as described herein, a memory system may implement a memory system controller configured to dynamically adjust a size of data transmitted to a host system to reduce overall system latency. For example, the memory system controller may support adjusting the size of the data transmitted to the host system based on monitoring a quantity of data requested by the host system. Specifically, the memory system controller may support receiving a read command for data of a first data size, incrementing (e.g., increasing a value of) a counter by the first data size, requesting the data from one or more memory devices according to a second data size based on the counter, and transmitting the data from the one or more memory devices according to a third data size based on the counter. In some examples, the memory system controller may determine the counter does not satisfy a threshold, and the memory system controller may configure the second or third data sizes as relatively smaller quantities of data (e.g., smaller than the first data size). However, in other examples, the memory system controller may determine the counter satisfies the threshold, and the memory system controller may configure the second or third data sizes as relatively larger quantities of data (e.g., equal to the first data size). Therefore, the memory system controller may support transmitting relatively smaller quantities of data to the host system, which may reduce the impact of the relatively longer transfer latency otherwise associated with the first channel, enabling relatively shorter wait durations for the second channel, and improving overall system latency.

In addition to applicability in memory systems as described herein, techniques for dynamically adjusting data read size may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by dynamically adjusting data read size, which may decrease processing or latency times, improve response times, or otherwise improve user experience, among other benefits.

Figure 2:
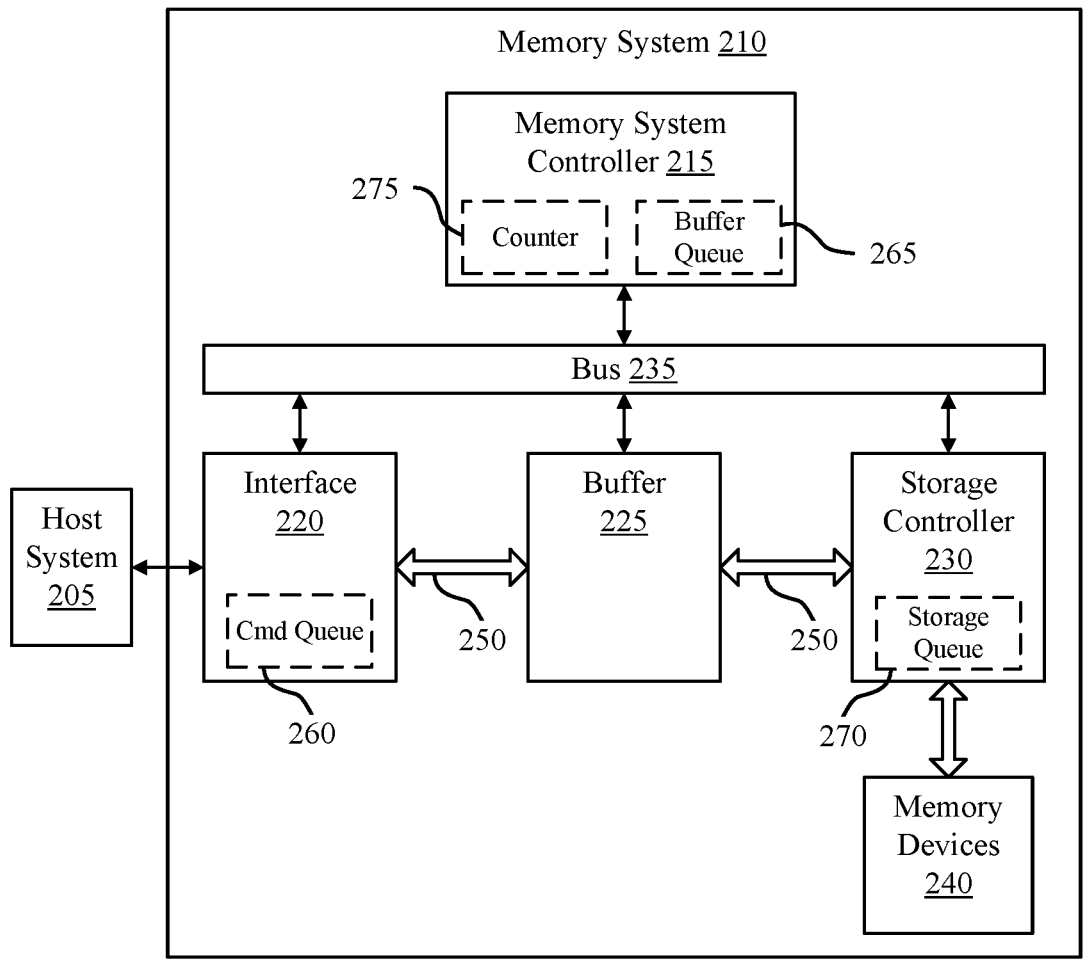
FIG. 2 illustrates an example of a system that supports dynamically adjusting data read size in accordance with examples as disclosed herein.

Features of the disclosure are initially described in the context of systems, devices, and circuits with reference to FIGS. 1 and 2. Features of the disclosure are described in the context of a system and timing diagrams with reference to FIGS. 3 through 4C. These and other features of the disclosure are further illustrated by and described in the context of an apparatus diagram and flowchart that relate to dynamically adjusting data read size with reference to FIGS. 5 through 7.

FIG. 1 illustrates an example of a system 100 that supports dynamically adjusting data read size in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

The memory system controller 115 may also include a counter 185. The counter 185 may include a value representative of a size of data requested from the host system 105 in one or more read commands from the host system 105. For example, the host system 105 may transmit a read command for data of a first data size to the memory system controller 115, and the value of the counter 185 may be incremented (e.g., increased) by the first data size.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support dynamically adjusting data read size. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as described herein, the memory system controller 115 may be configured to dynamically adjust a size of data transmitted to the host system 105 while performing a read operation. For example, the memory system controller 115 may support adjusting the size of the data transmitted to the host system 105 based on monitoring a quantity of data requested by the host system 105. Specifically, the memory system controller 115 may support receiving a read command for data of a first data size, incrementing the counter 185 by the first data size, requesting the data from one of the memory devices 130 according to a second data size based on the counter 185, and transmitting the data from the memory device 130 according to a third data size based on the counter 185. In some examples, the memory system controller 115 may determine the counter 185 does not satisfy a threshold, and the memory system controller 115 may configure the second or third data sizes as relatively smaller quantities of data (e.g., smaller than the first data size). However, in other examples, the memory system controller 115 may determine the counter 185 satisfies the threshold, and the memory system controller 115 may configure the second or third data sizes as relatively larger quantities of data (e.g., equal to the first data size). Therefore, the memory system controller 115 may support transmitting relatively smaller quantities of data to the host system 105, which may reduce the impact of the relatively longer transfer latency otherwise associated with the first channel, enabling relatively shorter wait durations for the second channel, and improving overall system latency.

FIG. 2 illustrates an example of a system 200 that supports dynamically adjusting data read size in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components. In some cases, the memory system controller 215 may be configured to communicate with the memory devices 240 over a first channel (e.g., an ONFI) which may include communication via other components of the memory system 210 as described herein. For example, the memory system controller 215 may be configured to request data from the memory device 240 by transmitting one or more read requests over the channel. Further, the memory system controller 215 may be configured to communicate with the host system 205 over a second channel (e.g., a UFS interface) which may include communication via other components of the memory system 210 as described herein. For example, the memory system controller 215 may be configured to transmit data to the host system 205 over the channel.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The memory system controller may increment a counter 275 based on a size of the access command. In some cases, the counter may be an example of a counter 185, as described with reference to FIG. 1. For example, incrementing the counter 275 may include increasing a value of the counter 275 by a data size (e.g., data transfer length) associated with the access command. The command may be removed from the command queue 260 after it has been retrieved (e.g., by the memory system controller 215) and the counter 275 has been incremented. In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. In some cases, this may additionally include incrementing the counter 275 based on a size of the read command and transmitting the data to the host system 205 in one or more protocol units (e.g., data packages) of a size based on the counter 275. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In accordance with examples as described herein, the memory system controller 215 may be configured to dynamically adjust a size of data transmitted to the host system 205 while performing a read operation. For example, the memory system controller 215 may support adjusting the size of the data transmitted to the host system 205 based on monitoring a quantity of data requested by the host system 205. Moreover, the memory system controller 215 may support receiving a read command for data of a first data size, incrementing the counter 275 by the first data size, requesting the data from one of the memory devices 240 according to a second data size based on the counter 275, and transmitting the data from the memory device 240 according to a third data size based on the counter 275. In some examples, the memory system controller 215 may determine the counter 275 does not satisfy a threshold, and the memory system controller 215 may configure the second or third data sizes as relatively smaller quantities of data (e.g., smaller than the first data size). However, in other examples, the memory system controller 215 may determine the counter 275 satisfies the threshold, and the memory system controller 215 may configure the second or third data sizes as relatively larger quantities of data (e.g., equal to the first data size). Therefore, the memory system controller 215 may support transmitting relatively smaller quantities of data to the host system 205, which may reduce the impact of the relatively longer transfer latency otherwise associated with the first channel, enabling relatively shorter wait durations for the second channel, and improving overall system latency.

Figure 3:
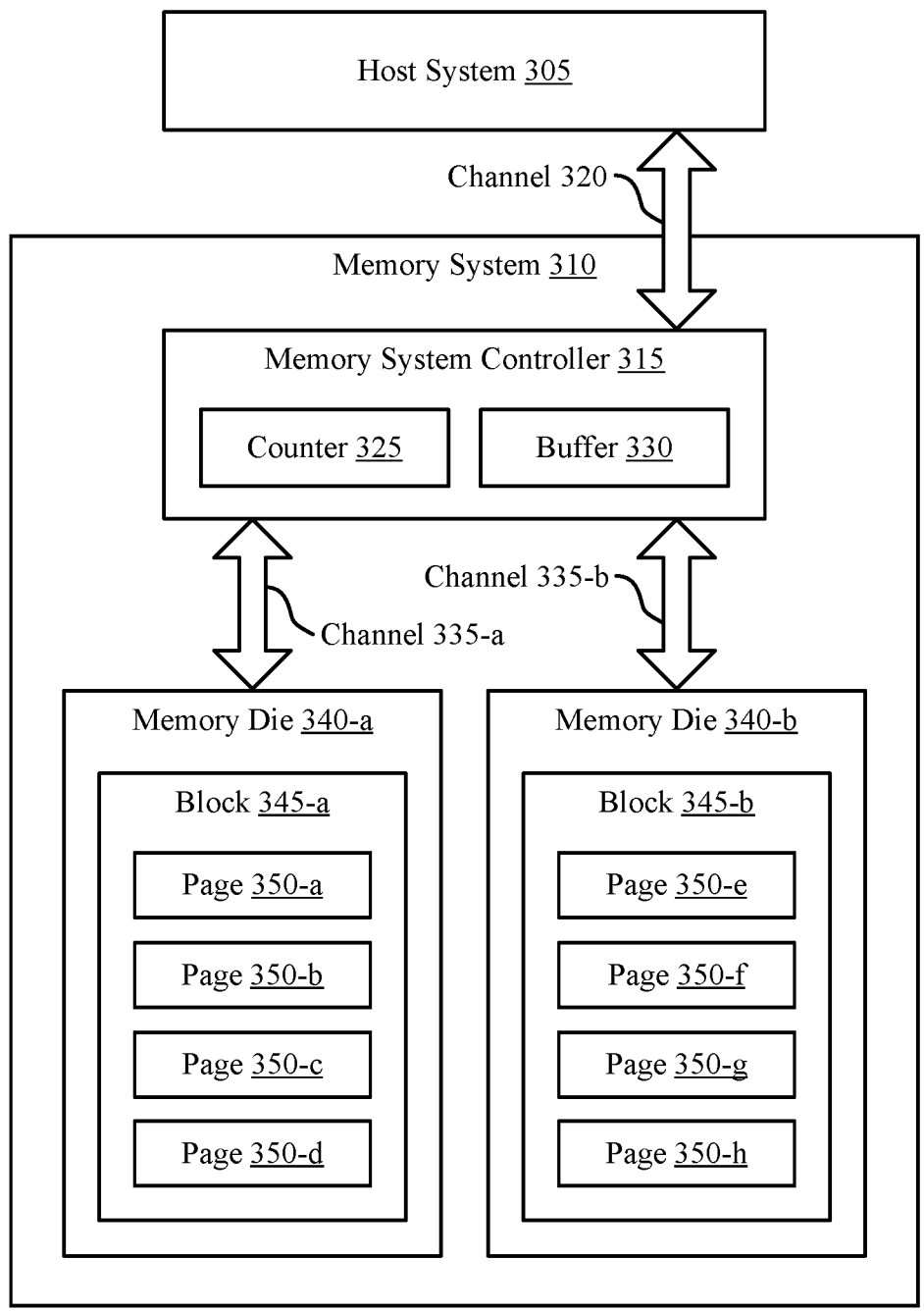
FIG. 3 illustrates an example of a system that supports dynamically adjusting data read size in accordance with examples as disclosed herein.

FIG. 3 illustrates an example of a system 300 that supports dynamically adjusting data read size in accordance with examples as disclosed herein. The system 200 may implement aspects of a system 100 or 200, as described with reference to FIGS. 1 and 2, respectively. For example, the system 300 may include a host system 305 and a memory system 310, which may be examples of a host system 205 and a memory system 210, as described with reference to FIG. 1, respectively. The system 300 illustrates an example of a memory system controller 315 configured to dynamically adjust a size of data transmitted to the host system 305 while performing a read operation.

The system 300 may include the memory system 310 operable to communicate with the host system 305 using the memory system controller 315, which may be an example of a memory system controller 215, as described with reference to FIG. 2. For example, the memory system controller 315 may be operable to perform operations on the memory system 310 in accordance with commands received from the host system 305 (e.g., as in an MNAND system). Specifically, the memory system controller 315 may communicate with the host system 305 over a channel 320 (e.g., a second channel). The channel 320 may support transmitting information formatted as protocol units which may include commands or data, among other information, between the memory system controller 315 and the host system 305. In some implementations, the channel 320 may include a physical interface (e.g., unified protocol (UniPro)), which may include physical layers (e.g., serial data lanes) with a relatively high data transfer speed. In some cases, the physical interface may transfer the protocol units of the channel 320 over physical channels as byte streams, which may be reassembled in protocol units at the receiver (e.g., at the memory system, at the host system).

The memory system controller 315 may include a counter 325 and a buffer 330, configured to temporarily store data for transmitting or accessing at a later time. For example, the buffer 330 may be configured to store data received from the host system 305 until a time at which the memory die 340 may be available for receiving the data. The memory system controller 315 may also include one or more command queues configured to store commands received from the host system 305 until a time at which the commands may be performed on the memory system 310, (e.g., due to other operations being performed concurrently with receiving the commands). The counter 325 may be configured to store a value associated with a quantity of data requested by the host system 305. For example, the memory system controller 315 may receive a read command of a first data size from the host system 305, and the value of the counter 325 may be incremented (e.g., increased) by the first data size. In some cases, the value of the counter 325 may be reset (e.g., to a 0 value) based on identifying an idle time, in which a duration between commands from the host system 305 satisfies a threshold. In some cases, the value of the counter 325 may be reset based on erasing data or commands from the buffer 330, such that a quantity of data or a quantity of commands remaining in the buffer 330 satisfies (e.g., is less than, is less than or equal to) a threshold. In other cases, the value of the counter 325 may be reset based on the memory system 310 entering, exiting, or remaining in a hibernation state or a low power state. For example, the value of the counter 325 may be reset based on the memory system 310 exiting the hibernation state, in which the memory system 310 may transition from the hibernation state associated with a relatively lower operating parameter (e.g., power consumption, bandwidth consumption) to an operating state associated with a relatively higher operating parameter (e.g., normal operating parameter).

The memory system 310 may include one or more memory dies 340 (e.g., a memory die 340-a, 340-b), which may be examples of memory devices 240, as described with reference to FIG. 2. Each memory die 340 may include one or more planes, where each plane may be associated with one or more blocks 345 (e.g., blocks 345-*a*, 345-*b*). Each block 345 may include a plurality of pages 350 (e.g., pages 350-*a*, 350-*b*, 350-*c*, 350-*d*, 350-*e*, 350-*f*, 350-*g*, 350-*h*), where each page 350 may be configured to store data in one or more memory cells associated with the respective page. In some implementations, the one or more memory cells may be configured to each store a single bit of data (e.g., SLC memory cells), two bits of data (e.g., MLC memory cells), three bits of data (e.g., TLC memory cells), four bits of data (e.g., QLC memory cells), or another quantity of data.

The memory system controller 315 may be configured to communicate with the one or more memory dies 340 over channels 335 (e.g., channels 335-*a*, 335-*b*). For example, the memory system controller 315 may communicate with each memory die 340 (e.g., memory die 340-*a*) over a respective channel 335 (e.g., a first channel) associated with the respective memory die 340 (e.g., channel 335-*a*). The channels 335 may support transmitting information such as commands, indications, and data, among other information, between the memory system controller 315 and the respective memory dies 340. In some implementations, the channels 335 may be examples of ONFI channels. In some cases, each of the channels 335 individually may be associated with a lower data transfer speed than the channel 320. In some cases, the memory system controller 315 may support concurrent operation over multiple channels 335, such that an aggregate data transfer speed of the channels 335 may be equal to, or greater than, the data transfer speed of the channel 320.

In some cases, the memory system controller 315 may perform single-die access operations on the one or more memory dies 340 in accordance with access commands received from the host system 305. For example, the memory system controller 315 may receive a read command from the host system 305 over the channel 320, and the memory system controller 315 may transmit one or more read requests to at least one of the memory dies 340 over at least one of the channels 335. The at least one memory die 340 may transmit one or more data transfers in response to the one or more read requests over the channels 335 to the memory system controller 315. In some cases, the memory dies 340 may transmit the one or more data transfers in an order according to memory system controller 315 instructing the one or more memory dies 340 to perform the single-die access operation, such that data may be transmitted sequentially from each page 350 of at least one block 345 of a first memory die 340 (e.g., the memory die 340-*a*) before sequentially transmitting data from each page 350 of at least one block 345 of a second memory die 340 (e.g., the memory die 340-*b*). For example, data may be read in an alphabetical order of the illustrated pages (e.g., read page 350-*a*, read page 350-*b*, read page 350-*c*, read page 350-*d*, read page 350-*e*, and so forth) as illustrated in the system 300.

The system 300 as described herein may be configured to perform operations which may dynamically adjust a size of data transmitted between the host system 305, the memory system controller 315, or the memory dies 340 while performing a read operation. Thus, the memory system controller 315 may support transmitting relatively smaller quantities of data to the host system 305, which may reduce the impact of the relatively longer transfer latency otherwise associated with the channels 335, enabling relatively shorter wait durations for the channel 320, and improving overall system latency.

Figure 4A:
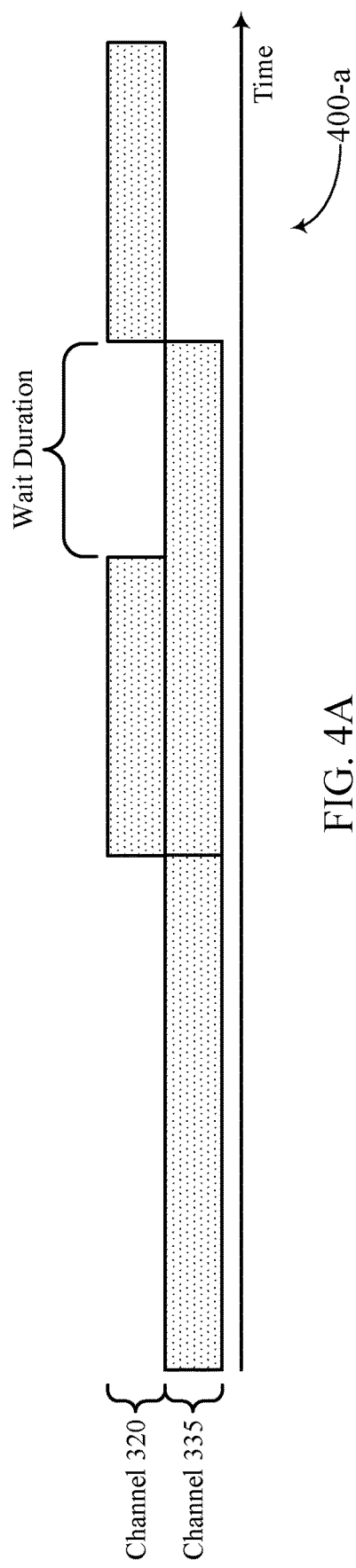
FIGS. 4A, 4B, and 4C illustrate examples of timing diagrams that support dynamically adjusting data read size in accordance with examples as disclosed herein.
Figure 4B:
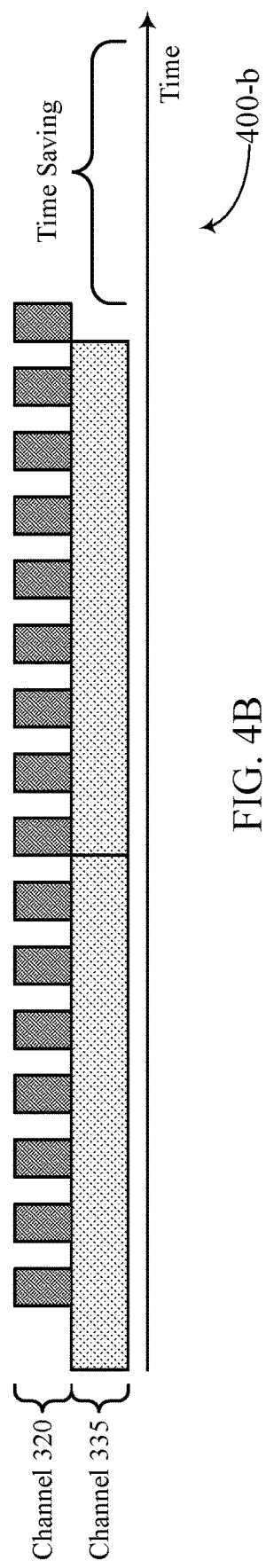
Figure 4C:
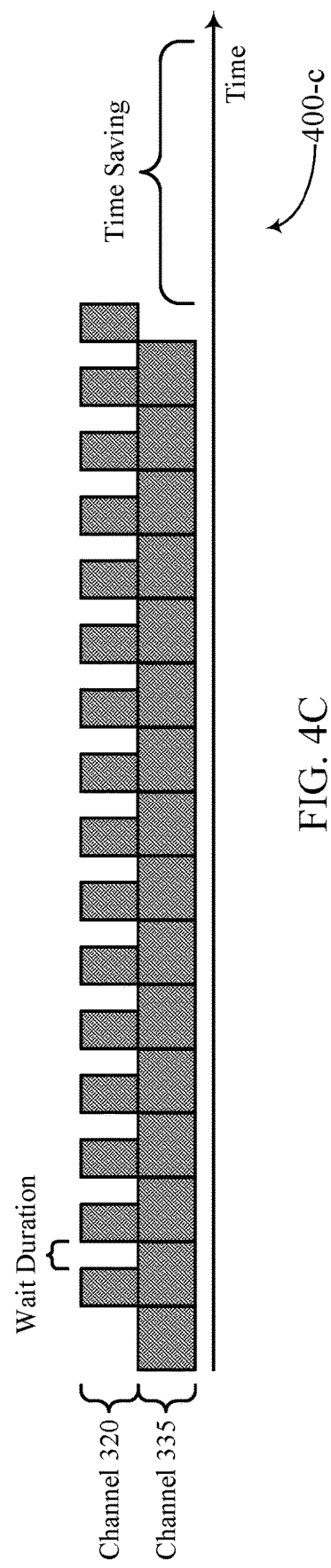

FIGS. 4A, 4B, and 4C illustrate examples of timing diagrams 400 (e.g., timing diagrams 400-*a*, 400-*b*, and 400-*c*) that support dynamically adjusting data read size in accordance with examples as disclosed herein. The timing diagrams 400 may illustrate operations performed by the system 300, as described with reference to FIG. 3. For example, the timing diagrams 400 may illustrate durations for transferring data between a host system 305, a memory system controller 315, and memory dies 340, over channels 320 and 335 (e.g., channel 335-*a*, 335-*b*) during performing a single-die read operation, as described with reference to FIG. 3. The timing diagram 400-*a* may illustrate durations for transferring the data over the channels 320 and 335 using relatively large data sizes. The timing diagram 400-*b* may illustrate durations for transferring the data over the channel 320 using relatively small data sizes, and over the channel 335 using relatively large data sizes. The timing diagram 400-*c* may illustrate durations for transferring the data over the channels 320 and 335 using relatively small data sizes.

Each timing diagram 400 may illustrate durations for transferring data over the channels 320 and 335 during performing a single-die read operation as described herein. The single-die read operation may include receiving, at the memory system controller 315, a read command from the host system 305. The read command may indicate a first quantity of data to be read from one or more logical addresses, where the first quantity of data is a first data size (e.g., data transfer length). In some cases, the first data size may be a relatively large quantity of data (e.g., 48 KB, 96 KB). After receiving the read command, the memory system controller 315 may increment a counter 325 (e.g., increase a value of the counter 325) by the first data size. The memory system controller 315 may compare the value of the counter 325 to a threshold based on incrementing the counter 325. In some cases, the threshold may be configured based on a quantity of bits that may be stored in each memory cell of the one or more memory dies 340 associated with the read command. For example, the threshold may be configured differently based on determining the memory cells are SLCs, MLCs, TLCs, or QLCs. In other cases, the threshold may be configured based on a quantity of planes in the one or more memory dies 340 associated with the read command. For example, the threshold may be configured based on determining the memory die 340 includes 4 planes or 6 planes.

The memory system controller 315 may translate the logical addresses associated with the read command and transmit one or more read requests to the one or more memory dies 340 in response to receiving the read command. In some cases, the logical addresses associated with the read command may correspond to one of the memory dies 340 (e.g., the memory die 340-*a*), due to initial programming of data associated with the logical addresses corresponding to a single-die programming operation (e.g., in which at least one block of a first memory die 340 is programmed before programming at least one block of a second memory die 340). In some such cases, the memory system controller 315 may issue one or more read requests to one of the memory dies 340, where each read request of the one or more read requests corresponds to a second data size. After receiving at least one read request, at least one memory die 340 may transmit one or more transfers of data to the memory system controller 315 over the channel 335. For example, the transfers of data may be ordered such that each page of at least one memory block of a first memory die 340 (e.g., a memory block 345-*a*) is transferred before transferring each page of at least one memory block of a second memory die 340 (e.g., a memory block 345-*b*). In some such examples, data from one or more blocks of the first memory die 340 may be transferred before data from one or more blocks of the second memory die 340 is transferred. In some cases, the first data size associated with the read command may be a relatively large quantity of data, or the logical addresses associated with the read command may correspond to at least one block in each memory die 340, such at least one read request may be issued to each memory die 340. In some such cases, each memory die 340 may transmit one or more transfers of data corresponding to the at least one read request over the respective channels 335. The one or more transfers of data may include a second quantity of data corresponding to the second data size.

After receiving the one or more transfers of data, the memory system controller 315 may generate a plurality of protocol units using the transfers of data. Generating the plurality of protocol units may include performing an error correction operation on the transfers of data, where errors in the transfers of data may be identified and corrected or data having errors identified may be retransmitted from the one or more memory dies 340. The plurality of protocol units may include a third quantity of data, where the third quantity of data is associated with a third data size corresponding to the size of each protocol unit. Accordingly, the plurality of protocol units may be transmitted to the host system 305 over the channel 320 with the third data size.

As illustrated in the timing diagrams 400-*a* and 400-*b*, the second data size associated with the read requests and the transfers of data may be equal to the first data size associated with the read commands, such that the second data size may be the relatively large quantity of data (e.g., 48 KB). However, as illustrated in the timing diagram 400-*c*, the second data size may be less than the first data size, such that the second data size may be a relatively small quantity of data (e.g., 16 KB, 4 KB). In some cases, the second data size may be determined based on an outcome of the comparison of the counter 325 and the threshold. For example, the second data size may be the relatively small quantity of data based on determining that the counter 325 does not satisfy the threshold, whereas the second data size may be the relatively large quantity of data based on determining that the counter 325 satisfies the threshold.

As illustrated in the timing diagram 400-*c*, the third data size associated with the protocol units may be equal to the second data size, such that the third data size may be the relatively small quantity of data (e.g., 16 KB, 4 KB). However, as illustrated in the timing diagram 400-*a*, the third data size may be equal to the second data size, such that the third data size may be the relatively large quantity of data (e.g., 48 KB). Conversely, as illustrated in the timing diagram 400-*b*, the third data size may be less than the second data size, such that the third data size may be the relatively small quantity of data (e.g., 16 KB, 4 KB). In some cases, the third data size may be determined based on an outcome of the comparison of the counter 325 and the threshold. For example, the third data size may be the relatively small quantity of data based on determining that the counter 325 does not satisfy the threshold, whereas the third data size may be the relatively large quantity of data based on determining that the counter 325 satisfies the threshold.

The timing diagram 400-*a* may illustrate an example in which the read requests, transfers of data, and the protocol units are a same data size (e.g., 48 KB) as the read command. In some cases, the channel 320 may support a relatively higher data transfer speed than the channel 335. Therefore, transfer of a quantity of data over channel 335 may be associated with a relatively longer duration than transfer of the same quantity of data over channel 320. Because the plurality of protocol units may not be transmitted until after the transfers of data are received at the memory system controller 315, the difference in durations may result in a wait duration, due to the size of the protocol units being the same size as the read command and thus causing the memory system controller 315 to wait for the transfer of data over the channel 335 to complete before transmitting the corresponding protocol unit over the channel 320. Further, because the protocol units may not be transmitted until after the transfers of data are received at the memory system controller 315, the overall latency for receiving the plurality of protocol units associated with the read command at the host system 305 may be based on data sizes of the read requests, transfers of data, and the protocol units. Thus, a relatively large data size of the read requests, transfers of data, and the protocol units may result in a relatively longer wait duration and relatively higher overall latency.

The timing diagram 400-*b* may illustrate an example in which the protocol units are a relatively smaller data size than the read requests, transfers of data, and the read command. Because the plurality of protocol units are a relatively smaller data size, the host system 305 may begin receiving the protocol units at a relatively earlier time than as illustrated in the timing diagram 400-*a*, resulting in time saving otherwise associated with transmitting the plurality of protocol units. In some cases, the protocol units may be transferred while the transfers of data are being received such that concurrent operation may occur to further promote the time saving. For example, once a quantity of data, (e.g., 4 KB) from the one or more transfers of data, is received from at least one memory die 340, a first protocol unit corresponding to the quantity of data may be transmitted to the host system 305 concurrently with receiving a next quantity of data (e.g., 4 KB). In some implementations, the memory system controller 315 may include a protocol unit component which may monitor for when the quantity of data from the one or more transfers of data, stored temporarily in the buffer, is equivalent to the determined third data size. Then, the protocol unit component may perform error correction on the quantity of data (e.g., such that CRC bits may be added to the quantity of data) and the protocol unit component may assemble the protocol unit from the quantity of data. For example, according to the timing diagram 400-*a*, in which the third data size is equivalent to the first data size, the protocol unit component may not generate the protocol unit until all the data associated with the command is received at the memory system controller 315. However, according to the timing diagram 400-*b*, in which the third data size is less than the first data size, the protocol unit component may generate each protocol unit after the quantity of data from the one or more transfers of data are received at the memory system controller 315, which may be relatively more frequent, and promote more frequent transmission of the protocol units. In some such examples, due to the third data size being less than the second data size, a protocol unit may be transmitted each time the quantity of data from the one or more transfers of data is equivalent to the third data size.

The timing diagram 400-*c* may illustrate an example in which the read requests, transfers of data, and the protocol units are a relatively smaller data size than the read command. Because the plurality of protocol units are a relatively smaller data size, the wait duration may be decreased. Further, because each protocol unit may not be transmitted until all the data associated with the respective protocol unit is received resulting from the transfers of data to the memory system controller 315, the overall latency for receiving the plurality of protocol units associated with the read command at the host system 305 may be relatively lower due to the relatively smaller data size resulting in time saving otherwise associated with transmitting the plurality of protocol units. In some cases, the protocol units may be transferred while the transfers of data are being received such that concurrent operation may occur to further promote the time saving. For example, once a quantity of data, (e.g., 4 KB) from the one or more transfers of data, is received from at least one memory die 340, a first protocol unit corresponding to the quantity of data may be transmitted to the host system 305 concurrently with receiving a next quantity of data (e.g., 4 KB). In some implementations, the memory system controller 315 may include a protocol unit component which may monitor for when the quantity of data from the one or more transfers of data, stored temporarily in the buffer, is equivalent to the determined third data size. Then, the protocol unit component may perform error correction on the quantity of data (e.g., such that CRC bits may be added to the quantity of data) and the protocol unit component may assemble the protocol unit from the quantity of data. For example, according to the timing diagram 400-c, in which the third data size is less than the first data size, the protocol unit component may generate each protocol unit after the quantity of data from the one or more transfers of data are received at the memory system controller 315, which may be relatively more frequent, and promote more frequent transmission of the protocol units. In some such examples, due to the third data size being equivalent to the second data size, each time a transfer of data is received at the memory system controller 315, a protocol unit corresponding to the transfer of data may be transmitted.

As described herein, the system 300 may be configured to dynamically adjust a size of data transmitted between the host system 305, the memory system controller 315, and the memory dies 340 while performing a read operation. For example, the memory system controller 215 may support adjusting the size of the data transmitted to the host system 205 based on monitoring a quantity of data requested by the host system 205. Thus, the memory system controller 215 may support transmitting relatively small quantities of data, which may reduce a relatively longer transfer latency otherwise associated with the channel 335, enabling relatively shorter wait durations for the channel 320, and improving overall system latency.

Figure 5:
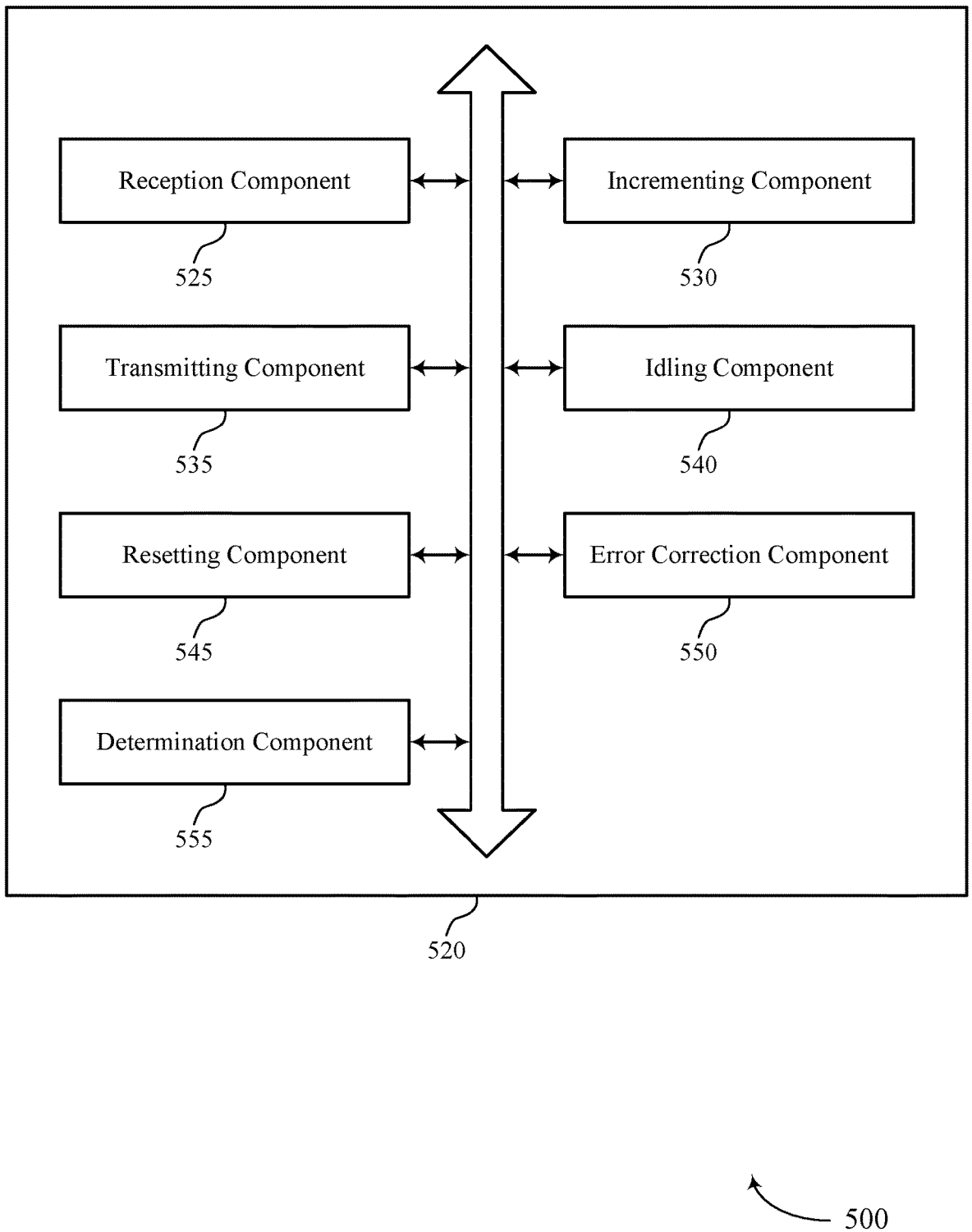
FIG. 5 illustrates a block diagram of a memory system that supports dynamically adjusting data read size in accordance with examples as disclosed herein.

FIG. 5 illustrates a block diagram 500 of a memory system 520 that supports dynamically adjusting data read size in accordance with examples as disclosed herein. The memory system 520 may be an example of aspects of a memory system as described with reference to FIGS. 1 through 4. The memory system 520, or various components thereof, may be an example of means for performing various aspects of dynamically adjusting data read size as described herein. For example, the memory system 520 may include a reception component 525, an incrementing component 530, a transmitting component 535, an idling component 540, a resetting component 545, an error correction component 550, a determination component 555, or any combination thereof. Each of these components may communicate, directly or indirectly, with one another (e.g., via one or more buses).

The reception component 525 may be configured as or otherwise support a means for receiving, at a memory system, a first read command associated with a first data size. The incrementing component 530 may be configured as or otherwise support a means for incrementing a counter by the first data size based at least in part on receiving the first read command. The transmitting component 535 may be configured as or otherwise support a means for transmitting data associated with the first read command in one or more protocol units each including a set of data of a second data size based at least in part on determining that the counter does not satisfy a threshold. In some examples, the reception component 525 may be configured as or otherwise support a means for receiving, at the memory system, a second read command associated with a third data size. In some examples, the incrementing component 530 may be configured as or otherwise support a means for incrementing the counter by the third data size based at least in part on receiving the second read command. In some examples, the transmitting component 535 may be configured as or otherwise support a means for transmitting data associated with the second read command in one or more protocol units each including a second set of data of a fourth data size greater than the second data size based at least in part on determining that the counter satisfies the threshold.

In some examples, the reception component 525 may be configured as or otherwise support a means for receiving, at a controller of the memory system, one or more transfers of data of a fifth data size from one or more memory devices of the memory system, where transmitting the data associated with the first read command includes transmitting, from the controller, the one or more protocol units each including the set of data of the second data size to a host system coupled with the memory system based at least in part on receiving the one or more transfers of data, where transmitting at least one of the one or more protocol units at least partially overlaps with receiving the one or more transfers of data.

In some examples, to support receiving the one or more transfers of data, the reception component 525 may be configured as or otherwise support a means for receiving the one or more transfers of data from a single memory device of the one or more memory devices.

In some examples, the reception component 525 may be configured as or otherwise support a means for receiving, at a controller of the memory system, one or more second transfers of data of a sixth data size from one or more memory devices of the memory system, where transmitting the data associated with the second read command includes transmitting, from the controller, the one or more protocol units each including the second set of data of the fourth data size to a host system coupled with the memory system subsequent to receiving the one or more second transfers of data.

In some examples, the idling component 540 may be configured as or otherwise support a means for entering an idle state based at least in part on a duration between receiving the second read command and receiving a third read command satisfying a threshold. In some examples, the resetting component 545 may be configured as or otherwise support a means for resetting the counter based at least in part on entering the idle state.

In some examples, the resetting component 545 may be configured as or otherwise support a means for exiting a hibernation state, where exiting the hibernation state includes transitioning from the hibernation state associated with a first operating parameter to an operating state associated with a second operating parameter greater than the first operating parameter, and resetting the counter based at least in part on exiting the hibernation state.

In some examples, the resetting component 545 may be configured as or otherwise support a means for resetting the counter based at least in part on a quantity of data in a buffer of the memory system associated with a controller of the memory system.

In some examples, the resetting component 545 may be configured as or otherwise support a means for resetting the counter based at least in part on a quantity of commands in a queue of a memory controller of the memory system satisfying a threshold.

In some examples, the threshold is configured based at least in part on a quantity of bits stored in each memory cell of the memory system.

In some examples, the threshold is configured based at least in part on a quantity of planes in each of one or more memory devices of the memory system.

In some examples, the reception component 525 may be configured as or otherwise support a means for receiving, at a controller of a memory system, a read command associated with a first data size. In some examples, the transmitting component 535 may be configured as or otherwise support a means for transmitting, from the controller to one or more memory devices of the memory system, one or more read requests each associated with a second data size based at least in part on receiving the read command, where the second data size is equal to or less than the first data size. In some examples, the reception component 525 may be configured as or otherwise support a means for receiving, at the controller from the one or more memory devices, one or more transfers of data of the second data size based at least in part on transmitting the one or more read requests. In some examples, the transmitting component 535 may be configured as or otherwise support a means for transmitting, by the controller based at least in part on receiving the read command, a plurality of protocol units including respective sets of the data of a third data size, where the third data size is less than the first data size, and where transmitting at least one of the plurality of protocol units at least partially overlaps with receiving the one or more transfers of the data.

In some examples, to support receiving the one or more transfers of data, the reception component 525 may be configured as or otherwise support a means for receiving the one or more transfers of data from a single memory device of the one or more memory devices.

In some examples, the error correction component 550 may be configured as or otherwise support a means for performing one or more error correction operations on the one or more transfers of data based at least in part on receiving the one or more transfers of data, where transmitting the plurality of protocol units is based at least in part on performing the one or more error correction operations.

In some examples, the incrementing component 530 may be configured as or otherwise support a means for incrementing a counter by the first data size based at least in part on receiving the read command.

In some examples, the determination component 555 may be configured as or otherwise support a means for determining whether the counter satisfies a threshold based at least in part on incrementing the counter, where the third data size is less than the second data size based on determining that the counter does not satisfy the threshold.

In some examples, the second data size is equal to the third data size.

In some examples, the determination component 555 may be configured as or otherwise support a means for determining whether the counter satisfies a threshold based at least in part on incrementing the counter, where the third data size is equal to the second data size based on determining that the counter satisfies the threshold.

Figure 6:
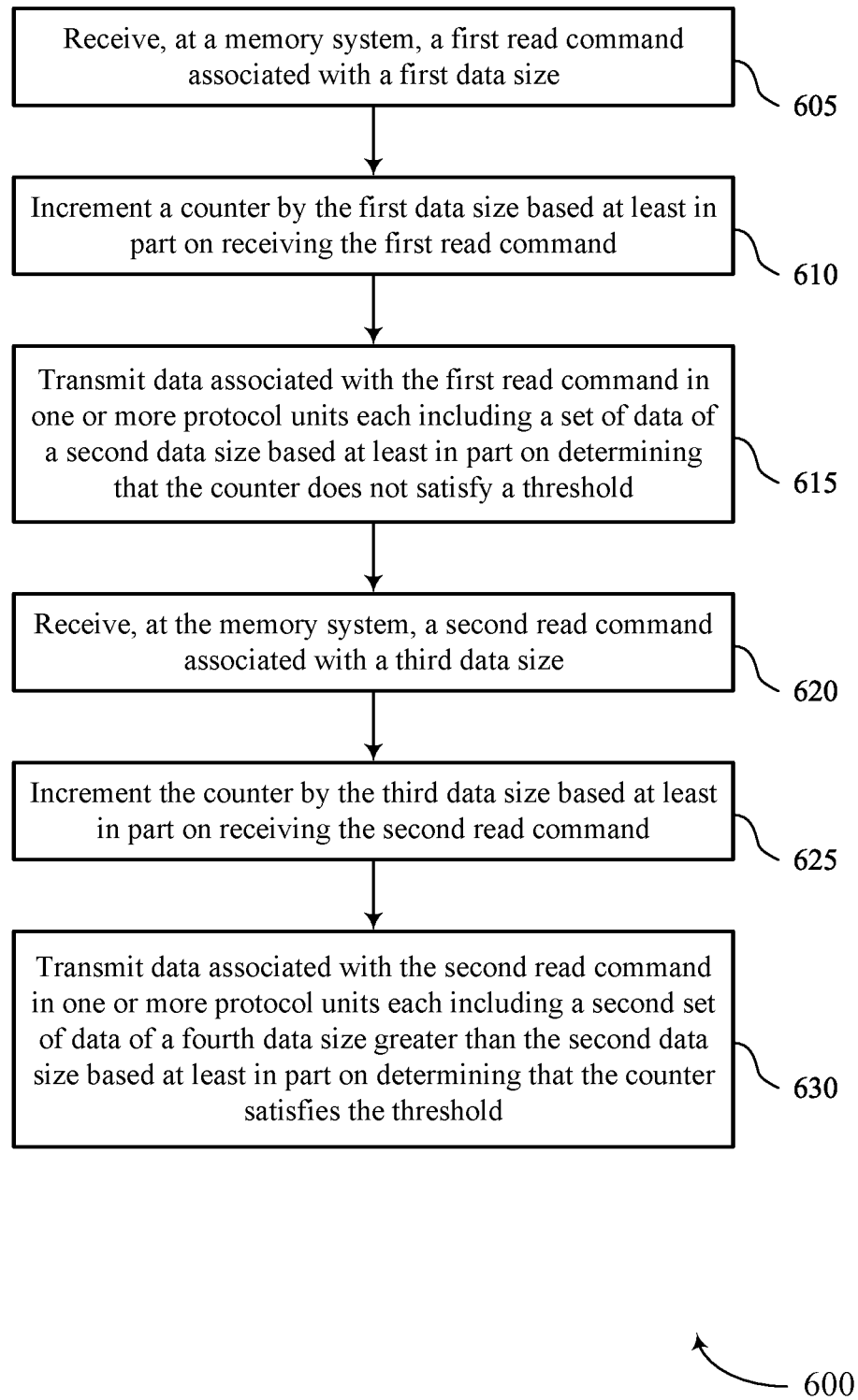
FIGS. 6 and 7 illustrate flowcharts showing a method or methods that support dynamically adjusting data read size in accordance with examples as disclosed herein.

FIG. 6 illustrates a flowchart showing a method 600 that supports dynamically adjusting data read size in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at a memory system, a first read command associated with a first data size. The operations of 605 may be performed in accordance with examples as disclosed herein. In some examples, aspects of the operations of 605 may be performed by a reception component 525 as described with reference to FIG. 5.

At 610, the method may include incrementing a counter by the first data size based at least in part on receiving the first read command. The operations of 610 may be performed in accordance with examples as disclosed herein. In some examples, aspects of the operations of 610 may be performed by an incrementing component 530 as described with reference to FIG. 5.

At 615, the method may include transmitting data associated with the first read command in one or more protocol units each including a set of data of a second data size based at least in part on determining that the counter does not satisfy a threshold. The operations of 615 may be performed in accordance with examples as disclosed herein. In some examples, aspects of the operations of 615 may be performed by a transmitting component 535 as described with reference to FIG. 5.

At 620, the method may include receiving, at the memory system, a second read command associated with a third data size. The operations of 620 may be performed in accordance with examples as disclosed herein. In some examples, aspects of the operations of 620 may be performed by a reception component 525 as described with reference to FIG. 5.

At 625, the method may include incrementing the counter by the third data size based at least in part on receiving the second read command. The operations of 625 may be performed in accordance with examples as disclosed herein. In some examples, aspects of the operations of 625 may be performed by an incrementing component 530 as described with reference to FIG. 5.

At 630, the method may include transmitting data associated with the second read command in one or more protocol units each including a second set of data of a fourth data size greater than the second data size based at least in part on determining that the counter satisfies the threshold. The operations of 630 may be performed in accordance with examples as disclosed herein. In some examples, aspects of the operations of 630 may be performed by a transmitting component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a first read command associated with a first data size; incrementing a counter by the first data size based at least in part on receiving the first read command; transmitting data associated with the first read command in one or more protocol units each including a set of data of a second data size based at least in part on determining that the counter does not satisfy a threshold; receiving, at the memory system, a second read command associated with a third data size; incrementing the counter by the third data size based at least in part on receiving the second read command; and transmitting data associated with the second read command in one or more protocol units each including a second set of data of a fourth data size greater than the second data size based at least in part on determining that the counter satisfies the threshold.

Aspect 2: The method, apparatus, or non-transitory computer-readable medium of aspect 1, further including operations, features, circuitry, logic, means, or instructions, or any combination thereof for receiving, at a controller of the memory system, one or more transfers of data of a fifth data size from one or more memory devices of the memory system, where transmitting the data associated with the first read command includes transmitting, from the controller, the one or more protocol units each including the set of data of the second data size to a host system coupled with the memory system based at least in part on receiving the one or more transfers of data, where transmitting at least one of the one or more protocol units at least partially overlaps with receiving the one or more transfers of data.

Aspect 3: The method, apparatus, or non-transitory computer-readable medium of aspect 2, where receiving the one or more transfers of data includes operations, features, circuitry, logic, means, or instructions, or any combination thereof for receiving the one or more transfers of data from a single memory device of the one or more memory devices.

Aspect 4: The method, apparatus, or non-transitory computer-readable medium of any of aspects 1 through 3, further including operations, features, circuitry, logic, means, or instructions, or any combination thereof for receiving, at a controller of the memory system, one or more second transfers of data of a sixth data size from one or more memory devices of the memory system, where transmitting the data associated with the second read command includes transmitting, from the controller, the one or more protocol units each including the second set of data of the fourth data size to a host system coupled with the memory system subsequent to receiving the one or more second transfers of data.

Aspect 5: The method, apparatus, or non-transitory computer-readable medium of any of aspects 1 through 4, further including operations, features, circuitry, logic, means, or instructions, or any combination thereof for entering an idle state based at least in part on a duration between receiving the second read command and receiving a third read command satisfying a threshold and resetting the counter based at least in part on entering the idle state.

Aspect 6: The method, apparatus, or non-transitory computer-readable medium of any of aspects 1 through 5, further including operations, features, circuitry, logic, means, or instructions, or any combination thereof for exiting a hibernation state, where exiting the hibernation state includes transitioning from the hibernation state associated with a first operating parameter to an operating state associated with a second operating parameter greater than the first operating parameter, and resetting the counter based at least in part on exiting the hibernation state.

Aspect 7: The method, apparatus, or non-transitory computer-readable medium of any of aspects 1 through 5, further including operations, features, circuitry, logic, means, or instructions, or any combination thereof for resetting the counter based at least in part on a quantity of data in a buffer of the memory system associated with a controller of the memory system.

Aspect 8: The method, apparatus, or non-transitory computer-readable medium of any of aspects 1 through 7, further including operations, features, circuitry, logic, means, or instructions, or any combination thereof for resetting the counter based at least in part on a quantity of commands in a queue of a memory controller of the memory system satisfying a threshold.

Aspect 9: The method, apparatus, or non-transitory computer-readable medium of any of aspects 1 through 8, where the threshold is configured based at least in part on a quantity of bits stored in each memory cell of the memory system.

Aspect 10: The method, apparatus, or non-transitory computer-readable medium of any of aspects 1 through 9, where the threshold is configured based at least in part on a quantity of planes in each of one or more memory devices of the memory system.

Figure 7:
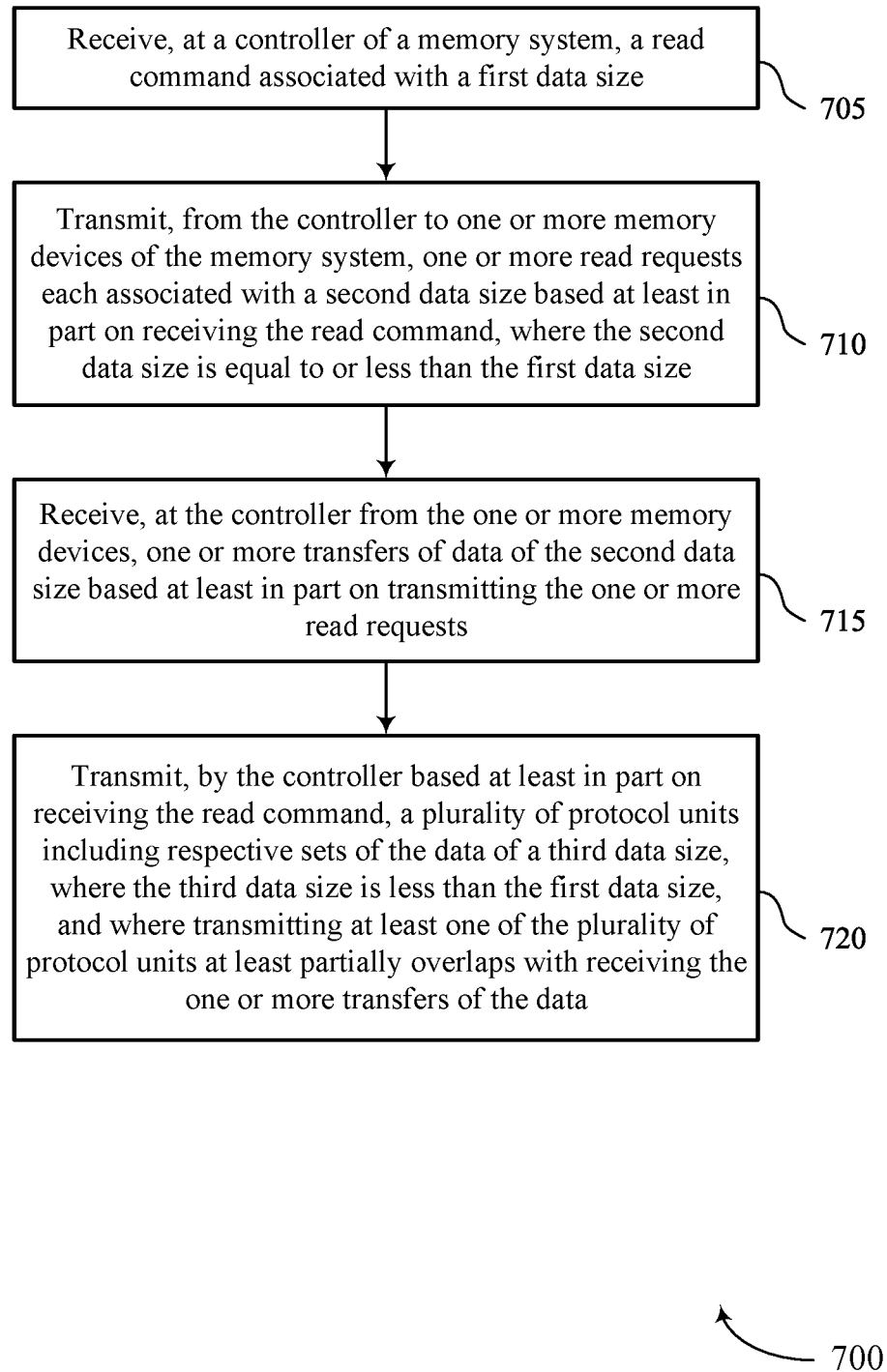

FIG. 7 illustrates a flowchart showing a method 700 that supports dynamically adjusting data read size in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving, at a controller of a memory system, a read command associated with a first data size. The operations of 705 may be performed in accordance with examples as disclosed herein. In some examples, aspects of the operations of 705 may be performed by a reception component 525 as described with reference to FIG. 5.

At 710, the method may include transmitting, from the controller to one or more memory devices of the memory system, one or more read requests each associated with a second data size based at least in part on receiving the read command, where the second data size is equal to or less than the first data size. The operations of 710 may be performed in accordance with examples as disclosed herein. In some examples, aspects of the operations of 710 may be performed by a transmitting component 535 as described with reference to FIG. 5.

At 715, the method may include receiving, at the controller from the one or more memory devices, one or more transfers of data of the second data size based at least in part on transmitting the one or more read requests. The operations of 715 may be performed in accordance with examples as disclosed herein. In some examples, aspects of the operations of 715 may be performed by a reception component 525 as described with reference to FIG. 5.

At 720, the method may include transmitting, by the controller based at least in part on receiving the read command, a plurality of protocol units including respective sets of the data of a third data size, where the third data size is less than the first data size, and where transmitting at least one of the plurality of protocol units at least partially overlaps with receiving the one or more transfers of the data. The operations of 720 may be performed in accordance with examples as disclosed herein. In some examples, aspects of the operations of 720 may be performed by a transmitting component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for receiving, at a controller of a memory system, a read command associated with a first data size; transmitting, from the controller to one or more memory devices of the memory system, one or more read requests each associated with a second data size based at least in part on receiving the read command, where the second data size is equal to or less than the first data size; receiving, at the controller from the one or more memory devices, one or more transfers of data of the second data size based at least in part on transmitting the one or more read requests; and transmitting, by the controller based at least in part on receiving the read command, a plurality of protocol units including respective sets of the data of a third data size, where the third data size is less than the first data size, and where transmitting at least one of the plurality of protocol units at least partially overlaps with receiving the one or more transfers of the data.

Aspect 12: The method, apparatus, or non-transitory computer-readable medium of aspect 11, where receiving the one or more transfers of data includes operations, features, circuitry, logic, means, or instructions, or any combination thereof for receiving the one or more transfers of data from a single memory device of the one or more memory devices.

Aspect 13: The method, apparatus, or non-transitory computer-readable medium of any of aspects 11 through 12, further including operations, features, circuitry, logic, means, or instructions, or any combination thereof for performing one or more error correction operations on the one or more transfers of data based at least in part on receiving the one or more transfers of data, where transmitting the plurality of protocol units is based at least in part on performing the one or more error correction operations.

Aspect 14: The method, apparatus, or non-transitory computer-readable medium of any of aspects 11 through 13, further including operations, features, circuitry, logic, means, or instructions, or any combination thereof for incrementing a counter by the first data size based at least in part on receiving the read command.

Aspect 15: The method, apparatus, or non-transitory computer-readable medium of aspect 14, further including operations, features, circuitry, logic, means, or instructions, or any combination thereof for determining whether the counter satisfies a threshold based at least in part on incrementing the counter, where the third data size is less than the second data size based on determining that the counter does not satisfy the threshold.

Aspect 16: The method, apparatus, or non-transitory computer-readable medium of aspect 15, where the second data size is equal to the third data size.

Aspect 17: The method, apparatus, or non-transitory computer-readable medium of any of aspects 14 through 16, further including operations, features, circuitry, logic, means, or instructions, or any combination thereof for determining whether the counter satisfies a threshold based at least in part on incrementing the counter, where the third data size is equal to the second data size based on determining that the counter satisfies the threshold.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory system comprising a counter; and
    a controller coupled with the memory system and configured to cause the apparatus to:
        receive, at the memory system, a first read command associated with a first data size;
        increment the counter by the first data size based at least in part on receiving the first read command;
        transmit data associated with the first read command in one or more first protocol units each comprising a set of data of a second data size based at least in part on determining that the counter does not satisfy a threshold;
        receive, at the memory system, a second read command associated with a third data size;
        increment the counter by the third data size based at least in part on receiving the second read command; and
        transmit data associated with the second read command in one or more second protocol units each comprising a second set of data of a fourth data size greater than the second data size based at least in part on determining that the counter satisfies the threshold.

2. The apparatus of claim 1, wherein the controller is further configured to cause the apparatus to:
    receive, at the controller of the memory system, one or more transfers of data of a fifth data size from one or more memory devices of the memory system, wherein transmitting the data associated with the first read command comprises transmitting, from the controller, the one or more first protocol units each comprising the set of data of the second data size to a host system coupled with the memory system based at least in part on receiving the one or more transfers of data, wherein transmitting at least one of the one or more first protocol units at least partially overlaps with receiving the one or more transfers of data.

3. The apparatus of claim 2, wherein receiving the one or more transfers of data is configured to cause the apparatus to:
    receive the one or more transfers of data from a single memory device of the one or more memory devices.

4. The apparatus of claim 1, wherein the controller is further configured to cause the apparatus to:
    receive, at the controller of the memory system, one or more second transfers of data of a sixth data size from one or more memory devices of the memory system, wherein transmitting the data associated with the second read command comprises transmitting, from the controller, the one or more second protocol units each comprising the second set of data of the fourth data size to a host system coupled with the memory system subsequent to receiving the one or more second transfers of data.

5. The apparatus of claim 1, wherein the controller is further configured to cause the apparatus to:
    enter an idle state based at least in part on a duration between receiving the second read command and receiving a third read command satisfying a second threshold; and
    reset the counter based at least in part on entering the idle state.

6. The apparatus of claim 1, wherein the controller is further configured to cause the apparatus to:
    exit a hibernation state, wherein exiting the hibernation state comprises transitioning from the hibernation state associated with a first operating parameter to an operating state associated with a second operating parameter greater than the first operating parameter; and
    reset the counter based at least in part on exiting the hibernation state.

7. The apparatus of claim 1, wherein the controller is further configured to cause the apparatus to:
    reset the counter based at least in part on a quantity of data in a buffer of the memory system associated with a memory controller of the memory system.

8. The apparatus of claim 1, wherein the controller is further configured to cause the apparatus to:
    reset the counter based at least in part on a quantity of commands in a queue of a memory controller of the memory system satisfying a second threshold.

9. The apparatus of claim 1, wherein the threshold is configured based at least in part on a quantity of bits stored in each memory cell of the memory system.

10. The apparatus of claim 1, wherein the threshold is configured based at least in part on a quantity of planes in each of one or more memory devices of the memory system.

11. An apparatus, comprising:
a memory system comprising one or more memory devices; and
a controller coupled with the memory system and configured to cause the apparatus to:
receive, at the controller, a read command associated with a first data size;
transmit, from the controller to the one or more memory devices, one or more read requests each associated with a second data size based at least in part on receiving the read command, wherein the second data size is equal to or less than the first data size;
receive, at the controller from the one or more memory devices, one or more transfers of data of the second data size based at least in part on transmitting the one or more read requests; and
transmit, by the controller based at least in part on receiving the read command, a plurality of protocol units comprising respective sets of the data of a third data size, wherein the third data size is less than the first data size, and wherein transmitting at least one of the plurality of protocol units at least partially overlaps with receiving the one or more transfers of the data.

12. The apparatus of claim 11, wherein receiving the one or more transfers of data is configured to cause the apparatus to:
receive the one or more transfers of data from a single memory device of the one or more memory devices.

13. The apparatus of claim 11, wherein the controller is further configured to cause the apparatus to:
perform one or more error correction operations on the one or more transfers of data based at least in part on receiving the one or more transfers of data, wherein transmitting the plurality of protocol units is based at least in part on performing the one or more error correction operations.

14. The apparatus of claim 11, wherein the controller is further configured to cause the apparatus to:
increment a counter by the first data size based at least in part on receiving the read command.

15. The apparatus of claim 14, wherein the controller is further configured to cause the apparatus to:
determine whether the counter satisfies a threshold based at least in part on incrementing the counter, wherein the third data size is less than the second data size based on determining that the counter does not satisfy the threshold.

16. The apparatus of claim 14, wherein the controller is further configured to cause the apparatus to:
determine whether the counter satisfies a threshold based at least in part on incrementing the counter, wherein the third data size is equal to the second data size based on determining that the counter satisfies the threshold.

17. A non-transitory computer-readable medium storing code comprising instructions which, when executed by a processor of an electronic device, cause the electronic device to:
receive, at a memory system, a first read command associated with a first data size;
increment a counter by the first data size based at least in part on receiving the first read command;
transmit data associated with the first read command in one or more first protocol units each comprising a set of data of a second data size based at least in part on determining that the counter does not satisfy a threshold;
receive, at the memory system, a second read command associated with a third data size;
increment the counter by the third data size based at least in part on receiving the second read command; and
transmit data associated with the second read command in one or more second protocol units each comprising a second set of data of a fourth data size greater than the second data size based at least in part on determining that the counter satisfies the threshold.

18. The non-transitory computer-readable medium of claim 17, wherein the instructions, when executed by the processor of the electronic device, further cause the electronic device to:
receive, at a controller of the memory system, one or more transfers of data of a fifth data size from one or more memory devices of the memory system, wherein transmitting the data associated with the first read command comprises transmitting, from the controller, the one or more first protocol units each comprising the set of data of the second data size to a host system coupled with the memory system based at least in part on receiving the one or more transfers of data, wherein transmitting at least one of the one or more first protocol units at least partially overlaps with receiving the one or more transfers of data.

19. The non-transitory computer-readable medium of claim 17, wherein the instructions, when executed by the processor of the electronic device, further cause the electronic device to:
receive, at a controller of the memory system, one or more second transfers of data of a sixth data size from one or more memory devices of the memory system, wherein transmitting the data associated with the second read command comprises transmitting, from the controller, the one or more second protocol units each comprising the second set of data of the fourth data size to a host system coupled with the memory system subsequent to receiving the one or more second transfers of data.

* * * * *